(12) United States Patent
Miller et al.

(10) Patent No.: US 11,833,937 B2
(45) Date of Patent: Dec. 5, 2023

(54) OCCUPANT SUPPORT

(71) Applicant: Faurecia Automotive Seating, LLC, Auburn Hills, MI (US)

(72) Inventors: Michael P. Miller, Auburn Hills, MI (US); Grzegorz Wojtowicz, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 164 days.

(21) Appl. No.: 17/469,296

(22) Filed: Sep. 8, 2021

(65) Prior Publication Data
US 2023/0071936 A1    Mar. 9, 2023

(51) Int. Cl.
*B60N 2/20* (2006.01)
*B60N 2/235* (2006.01)
*B60N 2/22* (2006.01)

(52) U.S. Cl.
CPC ........... *B60N 2/206* (2013.01); *B60N 2/2222* (2013.01); *B60N 2/2352* (2013.01); *B60N 2/2356* (2013.01); *B60N 2/236* (2015.04); *B60N 2/2354* (2013.01); *B60N 2/2362* (2015.04)

(58) Field of Classification Search
CPC .... B60N 2/2352; B60N 2/2356; B60N 2/236; B60N 2/2362; B60N 2/2222; B60N 2/206
See application file for complete search history.

(56) References Cited

U.S. PATENT DOCUMENTS

| | | | |
|---|---|---|---|
| 6,024,406 A | 2/2000 | Charras | |
| 8,702,172 B2 * | 4/2014 | Schmodde | B60N 2/3031 296/65.09 |
| 8,708,409 B2 | 4/2014 | Nitsuma | |
| 8,757,722 B2 | 6/2014 | Gupte | |
| 8,777,308 B2 | 7/2014 | Lee | |
| 2003/0047977 A1 * | 3/2003 | Lejeune | B60N 2/3011 297/344.1 |
| 2003/0056329 A1 * | 3/2003 | Coman | B60N 2/206 16/343 |
| 2009/0167066 A1 | 7/2009 | Mori | |
| 2009/0284063 A1 * | 11/2009 | Quast | B60N 2/2352 297/366 |
| 2011/0089736 A1 * | 4/2011 | Seibold | B60N 2/2356 297/367 R |
| 2014/0327285 A1 * | 11/2014 | Brines | A47C 1/024 297/354.1 |

FOREIGN PATENT DOCUMENTS

| | | | | |
|---|---|---|---|---|
| CA | 2390667 A1 * | 12/2002 | | B60N 2/206 |
| DE | 3333056 A1 * | 3/1985 | | |
| DE | 3527052 A1 * | 1/1987 | | |
| DE | 102007030427 A1 * | 7/2008 | | B60N 2/2222 |
| EP | 1932713 A1 * | 6/2008 | | B60N 2/206 |
| FR | 2820695 A1 * | 8/2002 | | B60N 2/206 |
| GB | 2395118 A * | 5/2004 | | A47C 7/405 |
| WO | WO-2008104348 A1 * | 9/2008 | | B60N 2/206 |
| WO | WO-2011015315 A1 * | 2/2011 | | B60N 2/206 |

* cited by examiner

*Primary Examiner* — David E Allred
(74) *Attorney, Agent, or Firm* — BARNES & THORNBURG LLP

(57) ABSTRACT

An occupant support includes a seat bottom and a seat back coupled to the seat bottom and arranged to extend upwardly away from the seat bottom in a normal-seating configuration. The seat back is pivotable relative to the seat bottom between a plurality of positions. The seat back may be changed from an upright position to a folded-forward position.

18 Claims, 6 Drawing Sheets

//www.w3.org/1999/xhtml">
OCCUPANT SUPPORT

BACKGROUND

The present disclosure relates to an occupant support, and particularly to an occupant support including a seat bottom and a seat back. More particularly, the present disclosure relates to an occupant support including a seat bottom and a seat back that is pivotable relative to the seat bottom.

SUMMARY

According to the present disclosure, an occupant support in accordance with the present disclosure includes a seat bottom and a seat back coupled to the seat bottom. The seat bottom extends generally horizontally relative to a floor. The seat back is arranged to extend upwardly from the seat bottom in a normal-seating configuration. The seat back is pivotable relative to the seat bottom about a recliner pivot axis between a forward-reclined position and a rearward-reclined position.

In illustrative embodiments, the seat back includes a backrest-frame support coupled to the seat bottom and a backrest frame coupled to the backrest-frame support and arranged to extend upward away from the backrest-frame support and the seat bottom in the normal-seating configuration. The occupant support is configured to change between a plurality of configurations or modes so that the occupant support can be used for various purposes.

In illustrative embodiments, the occupant support further includes a seat-back mode-changing unit that is configured to control movement of the seat back relative to the seat bottom to arrange the occupant support in one of the plurality of configurations or modes. The seat-back mode-changing unit includes a seat-back recliner and a backrest-frame brace unit. The seat-back recliner is coupled between the seat bottom and the backrest-frame support and provides the seat-back recliner pivot axis. The backrest-frame brace unit is coupled to the backrest-frame support and is configured to block movement of the backrest frame relative to the backrest-frame support about a backrest-frame pivot axis spaced apart from the recliner pivot axis when the occupant support is in the normal-seating configuration.

In illustrative embodiments, the seat-back mode-changing unit provides means for reclining the seat back relative to the seat bottom about the seat-back recline axis between the rearward-reclined position and the forward-reclined position. The seat-back mode-changing unit also provides means for pivoting a portion of the seat back forward toward the seat bottom about an upper pivot axis as the seat back pivots forward past the forward-reclined position to change the seat back from the normal-seating configuration to a folded-forward configuration in which the portion of the seat back extends generally horizontally relative to the seat bottom so that the seat back provides a console for an occupant seated next to the occupant support.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a side elevation and diagrammatic view of an occupant support in accordance with the present disclosure with portions cut away, showing the occupant support including a seat bottom, a seat back arranged to extend upwardly from the seat bottom in a normal-seating configuration of the occupant support, and a seat-back mode changing unit that controls movement of the seat back relative to the seat bottom between various positions in the normal-seating configuration, as shown in FIGS. 1 and 2, and a console configuration, as shown in FIG. 3;

Figure 10:
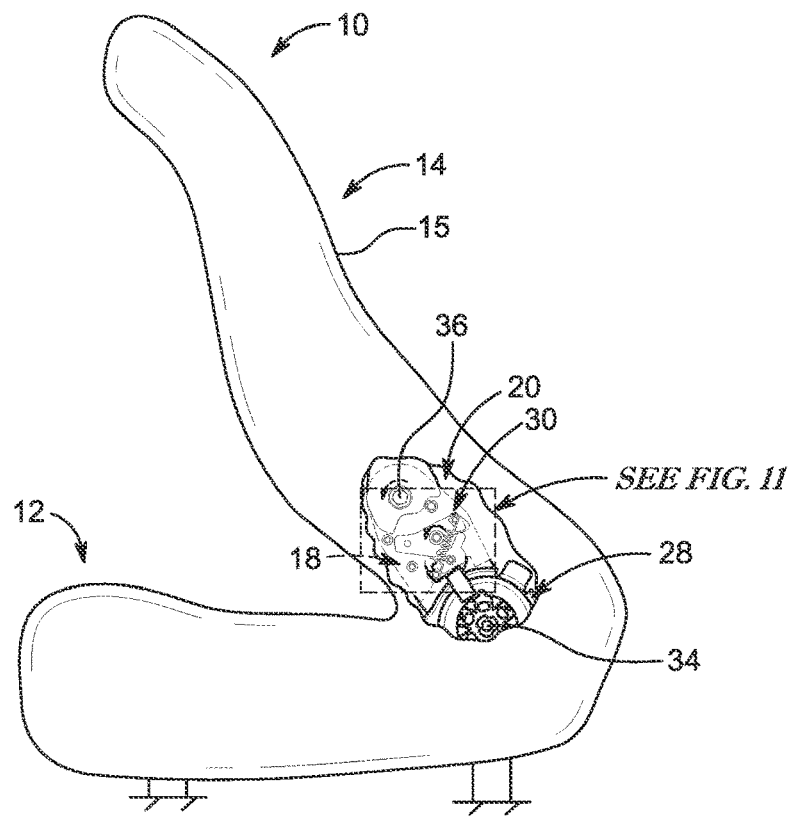
FIG. 10 is a side elevation view of the occupant support with portions cut away showing the seat back pivoted further toward the seat bottom.
Figure 11:
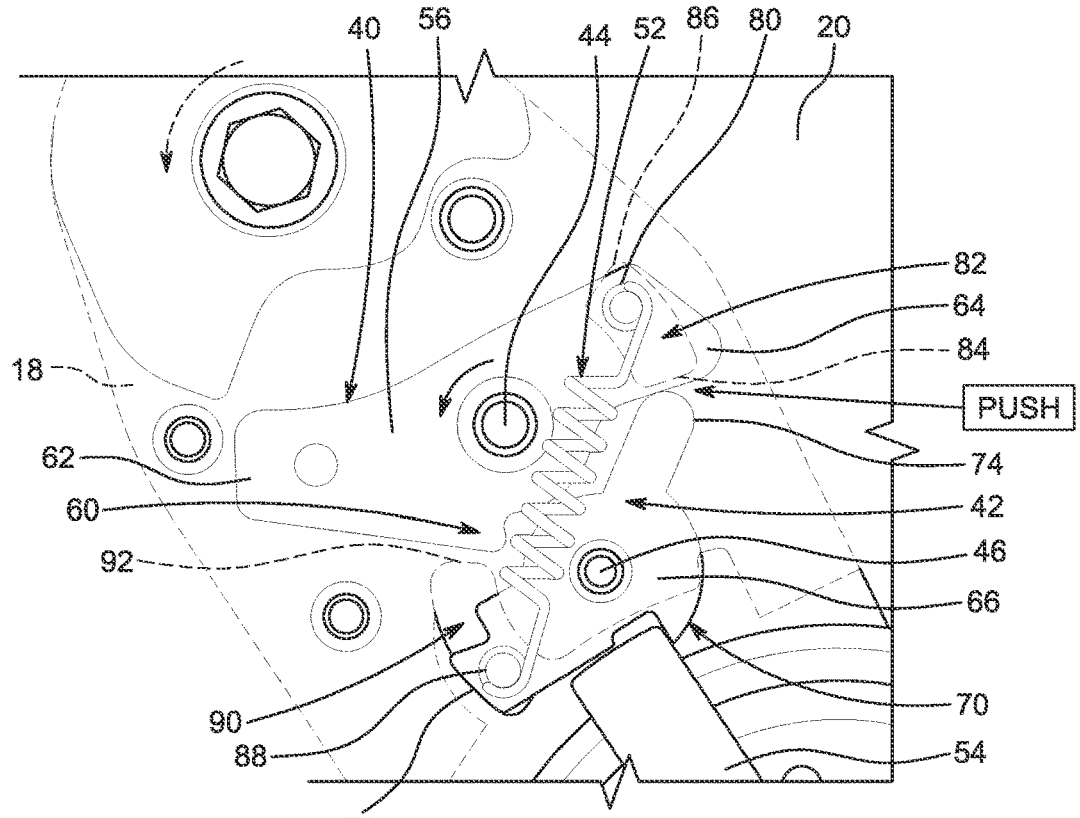
Figure 12:
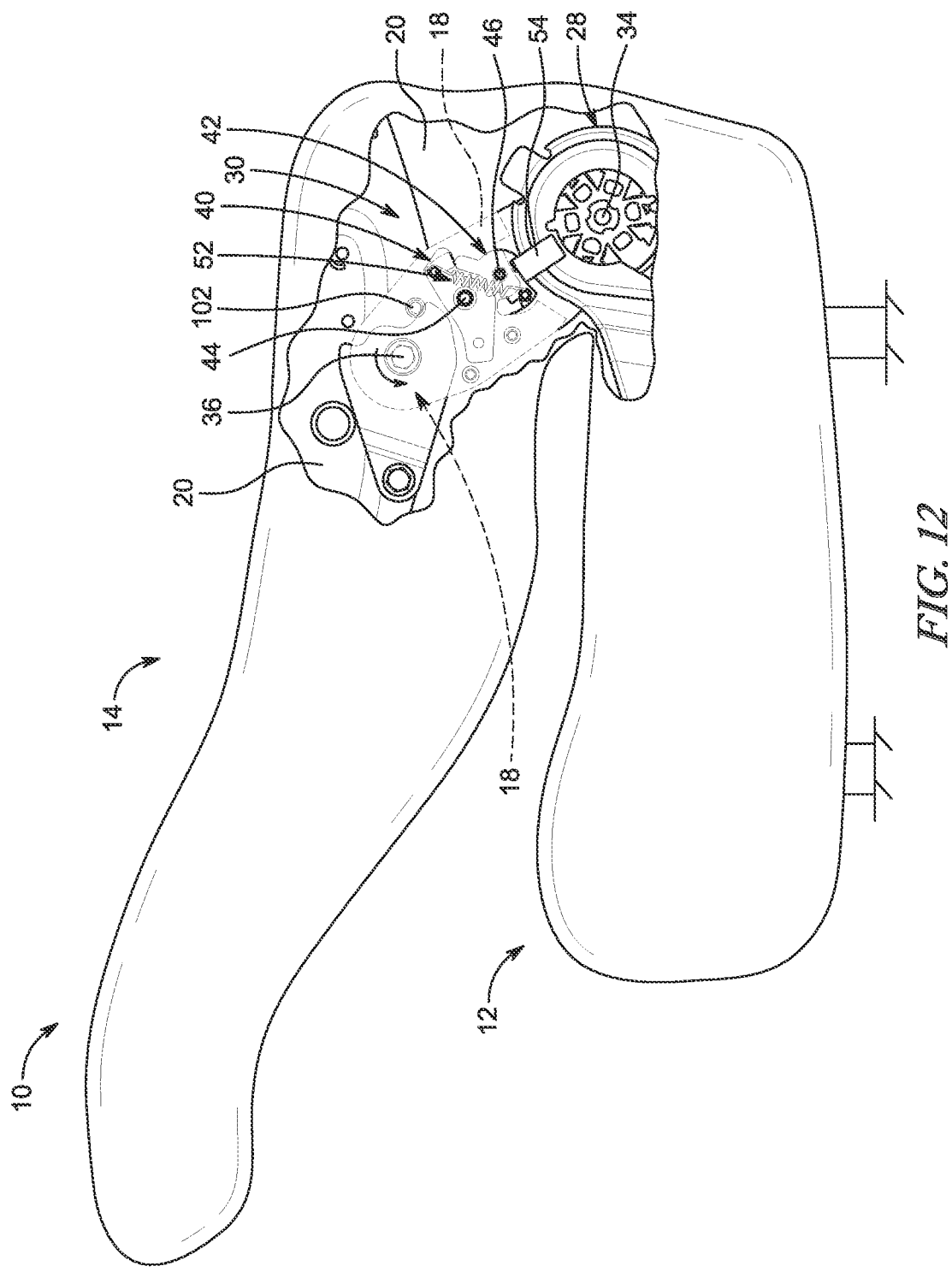

FIG. 11 is an enlarged view of a portion of FIG. 10 showing the slip-blocker lever pushing the pivot-blocker lever to pivot to a freed position in which a portion of the seat back is free to pivot about a separate backrest-frame axis separate from the recliner pivot axis to change the occupant support to the console configuration; and FIG. 12 is a side elevation view of the occupant support with portions cut away showing the occupant support in the console configuration.

DETAILED DESCRIPTION

Figure 1:
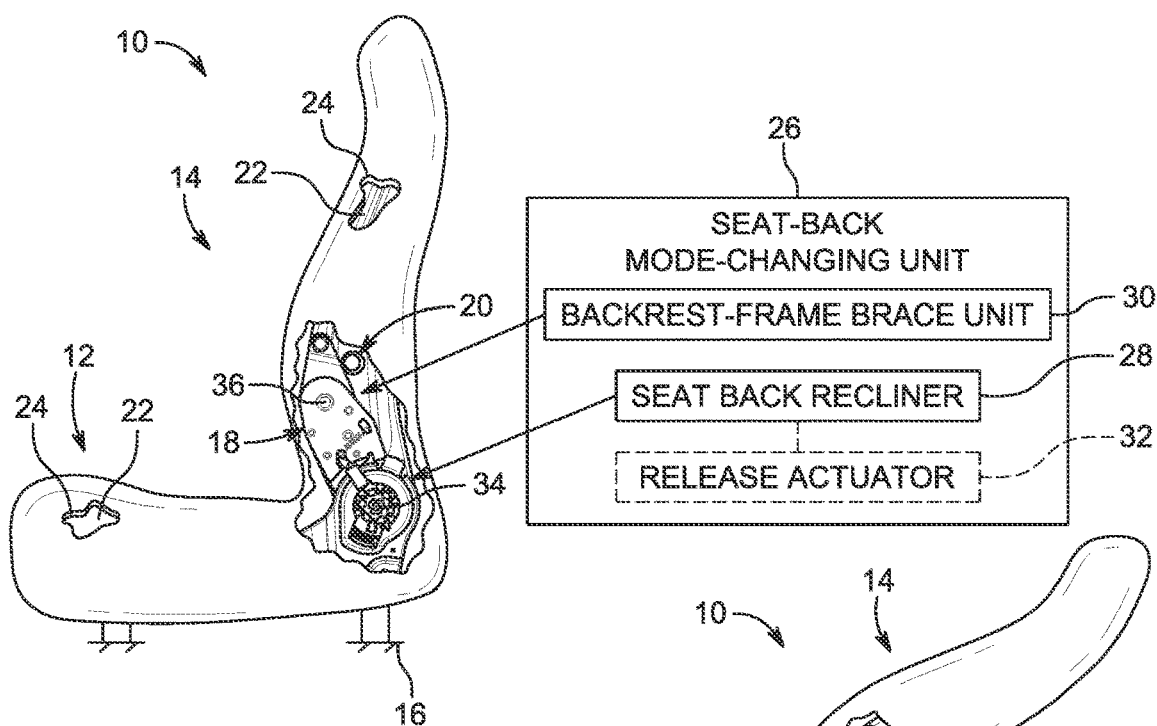
Figure 2:
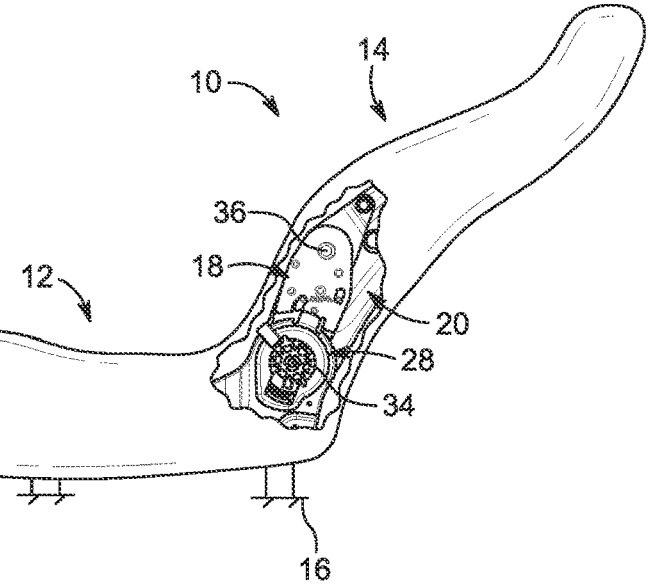
FIG. 2 is a side elevation view of the occupant support of FIG. 1 with portions cut away showing the seat back in a rearward-reclined position relative to the seat bottom.
Figure 3:
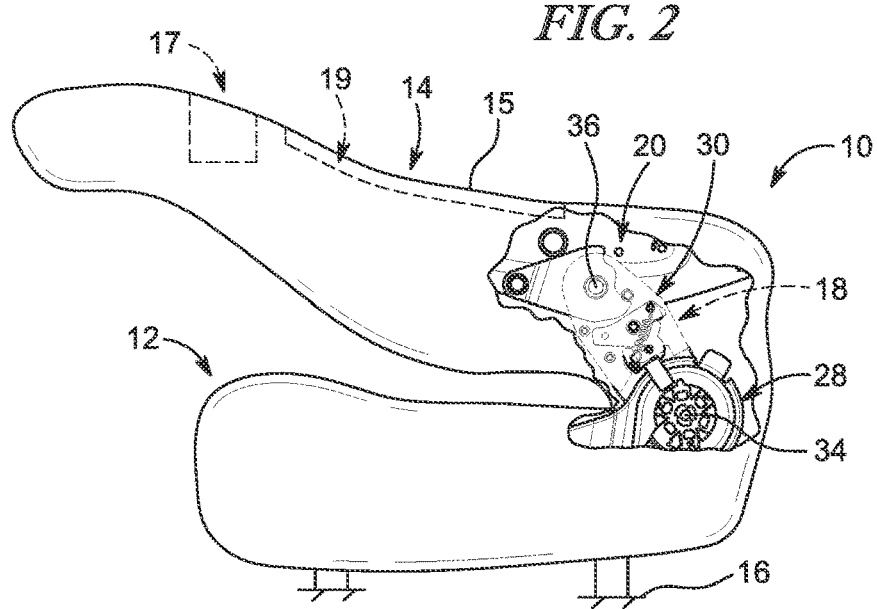
FIG. 3 is a side elevation view of the occupant support of FIGS. 1 and 2 with portions cut away showing the occupant support in the console configuration in which a portion of the seat back moves to a folded forward position so that occupants seated next to the occupant support can use features on a backside of the seat back such as a cup holder and an armrest.

An occupant support 10 in accordance with the present disclosure is configured to use in a normal-seating configuration, as shown in FIGS. 1 and 2, and a center-console configuration, as shown in FIG. 3. The occupant support 10 is configured to support an occupant in a vehicle, for example, and includes a seat bottom 12 and a seat back 14 coupled to the seat bottom 12. The seat bottom 12 extends generally horizontally relative to a floor 16. The seat back 14 is arranged to extend upwardly from the seat bottom 12 in the normal-seating configuration. The occupant support 10 may be fixed to the floor 16 or may be slidable relative to the floor 16 using one or more rails or tracks (not shown).

The seat back 14 includes a backrest-frame support 18 coupled to the seat bottom 12 and a backrest frame 20 coupled to the backrest-frame support 18 and arranged to extend upward away from the backrest-frame support 18 and the seat bottom 12 in the normal-seating configuration. Each of the seat bottom 12 and the seat back 14 also includes cushions 22 and trim 24 covering the cushions and structural components of the occupant support 10, such as backrest-frame support 18 and backrest frame 20 as shown in FIG. 1.

The occupant support 10 in the illustrative embodiment is configured to change between a plurality of configurations or modes so that the occupant support 10 can be used for various purposes as shown in FIGS. 1-3. The occupant support 10 further includes a seat-back mode-changing unit 26 that is configured to control movement of the seat back 14 relative to the seat bottom 12 to arrange the occupant support 10 in one of the plurality of configurations or modes. The seat-back mode-changing unit 26 includes a seat-back recliner 28 and a backrest-frame brace unit 30. The seat-back recliner 28 is coupled between the seat bottom 12 and the backrest-frame support 18 and provides a seat-back recliner pivot axis 34. The backrest-frame brace unit 30 is coupled to the backrest-frame support 18 and is configured to block movement of the backrest frame 20 relative to the backrest-frame support 18 when the occupant support 10 is in the normal-seating configuration.

It should be noted that the seat-back mode-changing unit 26 described herein references seat-back recliner 28 and backrest-frame unit 30 only on one lateral side of the occupant support 10. However, in the illustrative embodiment, the occupant support may also include an identical seat-back recliner 28 and/or backrest frame unit 30 on an opposite second lateral side of the occupant support 10.

The seat back 14 is configured to pivot about the seat-back recliner pivot axis 34 relative to the seat bottom 12 between a forward-reclined position, as shown in FIG. 1, and a rearward-reclined position, as shown in FIG. 2, when the seat back 14 is in the normal-seating configuration. In some embodiments, the seat-back recliner 28 may move to an unlocked configuration by actuating a release actuator 32 to cause the seat back 14 to disengage from the seat bottom 12 and allow the seat back 14 to pivot about the seat-back recliner pivot axis 34. The seat back 14 may be biased forward to pivot toward the seat bottom 12. In another embodiment, the seat-back recliner 28 moves in response to user inputs (i.e. via an electric motor) to pivot the seat back 14 relative to the seat bottom 12 and is self-locking when no user inputs are provided. In yet another embodiment, the occupant support 10 includes an electric motor that actuates and releases the release actuator 32 so that the seat back 14 is free to pivot relative to the seat bottom 12. The seat back recliner 28 may have internal or external stops that block movement of the seat back 14 about the seat-back recliner pivot axis 34 past the forward-reclined position and/or the rearward-reclined position. The seat back 14 may be locked in a plurality of positions between the forward-reclined position and the rearward-reclined position (i.e. by the seat-back recliner 28 and/or a separate lock coupled to the release actuator 32) in the normal-seating configuration. The seat back 14 may be biased to pivot forward about the seat-back recliner pivot axis 34 and about the backrest frame pivot axis 36 when the release actuator 32 is unlocked.

The backrest frame 20 is independently movable relative to the backrest-frame support 18 to change the occupant support 10 from the normal-seating configuration to the console configuration as shown in FIG. 3. The backrest frame 20 is coupled to the backrest-frame support 18 for pivotable movement relative to the backrest-frame support 18 about a backrest-frame pivot axis 36. The backrest frame 20 pivots about the backrest-frame pivot axis 36 between an upright position and a folded-forward position to arrange the occupant support 10 in the console configuration.

The backrest-frame pivot axis 36 is spaced apart from the seat-back recliner pivot axis 34 as shown in FIG. 3. When the backrest frame 20 is in the normal-seating configuration, the backrest frame 20 extends upwardly away from the seat bottom 12 and the backrest-frame support 18. When the backrest frame 20 is in the folded-forward position, the backrest frame 20 is arranged directly above and is generally parallel with the seat bottom 12 such that a backside 15 of the seat back 14 is arranged generally horizontal to the seat bottom 12 and the floor 16. The backrest-frame support 18 may continue to extend generally upwardly away from the seat bottom 12 when the backrest frame 20 is in the folded-forward position. The backside 15 of the seat back 14 may be formed to include one or more features for an occupant to use in the console configuration such as cup holders 17 and/or cushions 19 to provide an armrest for an occupant seated next to the occupant support 10.

The backrest frame 20 is configured to fold forward toward the seat bottom 12 relative to the backrest-frame support 18 only when the seat back 14 is pivoted forward relative to the seat bottom 12 past the forward-reclined position. Until the seat back 14 is pivoted past the forward-reclined position, the backrest-frame brace unit 30 blocks the backrest frame 20 from pivoting about the backrest-frame pivot axis 36 relative to the backrest-frame support 18.

Figure 4:
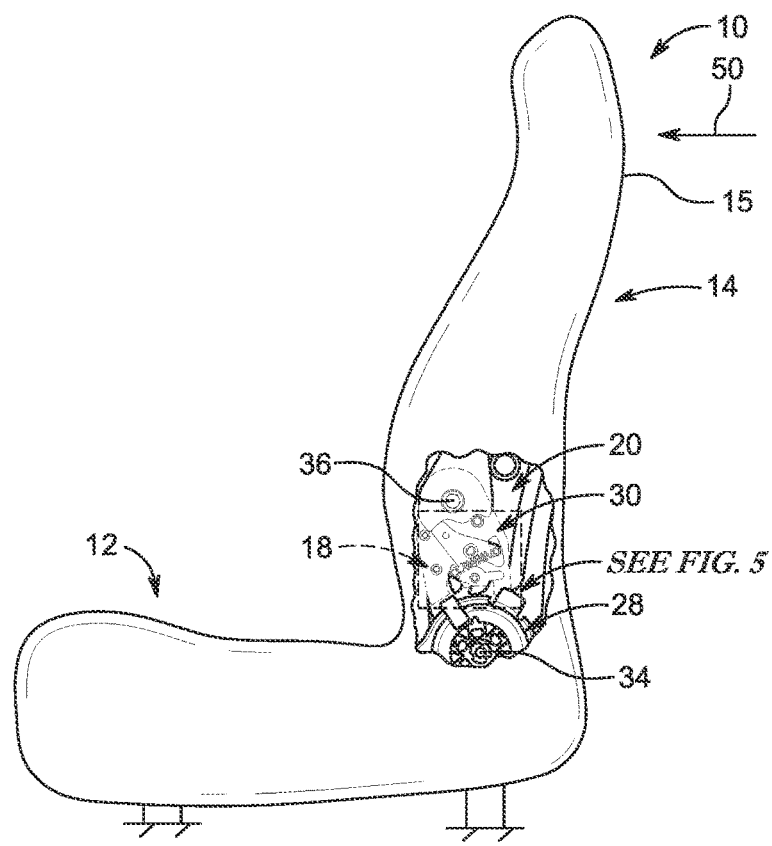
FIG. 4 is a side elevation view of the occupant support with portions cut away to show the occupant support in the normal-seating configuration and a forward force acting on the seat back, and showing that the seat-back mode changing unit includes a seat-back brace unit configured to block movement of the seat back in the normal-seating configuration.
Figure 5:
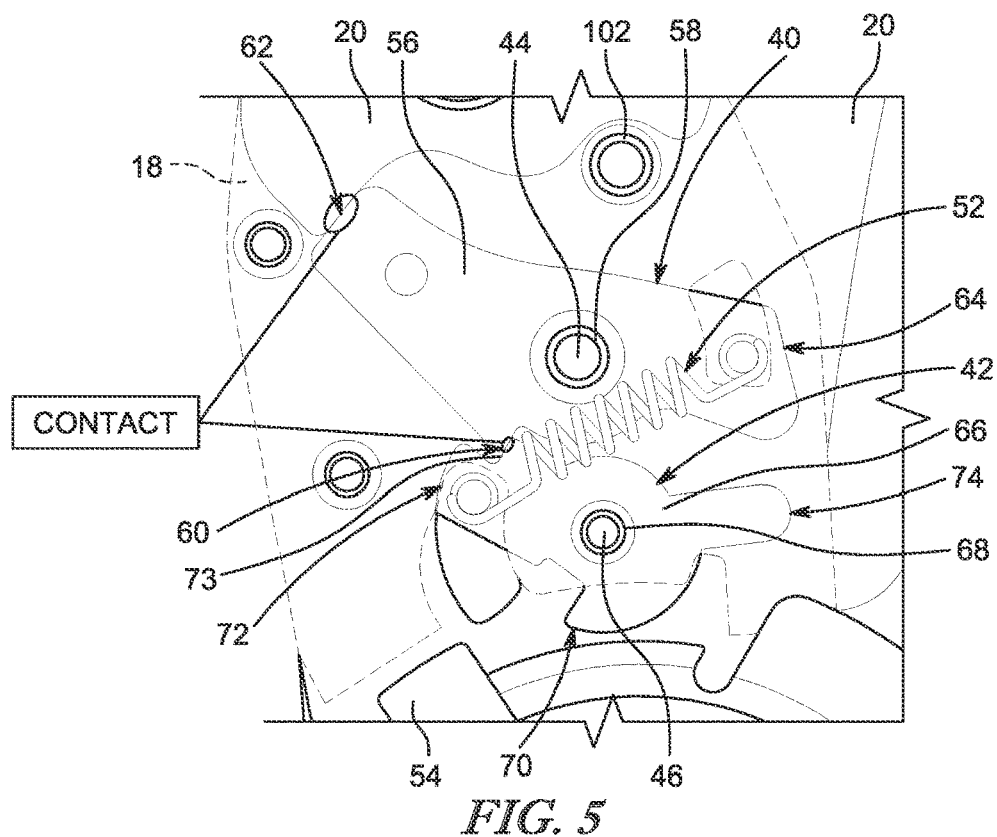
FIG. 5 is an enlarged view of a portion of the occupant support shown in FIG. 4 showing the seat-back brace unit contacting portions of the seat back to block pivoting of the seat back toward the seat bottom.

The backrest-frame brace unit 30 includes a backrest-frame pivot-blocker lever 40 coupled to the backrest-frame support 18 and a slip-blocker lever 42 coupled to the backrest-frame support 18 as shown in FIGS. 4 and 5. The backrest-frame pivot-blocker lever 40 is pivotable relative to the backrest frame 20 and the backrest-frame support 18 about a pivot-blocker lever axis 44. The slip-blocker lever 42 is pivotable relative to the backrest frame 20 and the backrest-frame support 18 about a slip-blocker pivot axis 46 spaced apart from the pivot-blocker pivot axis 44.

The backrest-frame brace unit 30 further includes biasing means for biasing the backrest-frame pivot-blocker lever 40 and the slip-blocker lever 42 normally to a locked configuration as shown in FIGS. 4 and 5. In the locked configuration, the backrest-frame pivot-blocker lever 40 and the slip-blocker lever 42 cooperate to block movement of the backrest frame 20 from the upright position to the folded-forward position while the seat back 14 is in the normal-seating configuration. For example, a forward force 50 acting on the seat back 14 will not cause the backrest frame 20 to pivot toward the seat bottom 12 as long as the occupant support 10 is in the normal-seating configuration. The forward force 50 causes the backrest frame 20 to contact the backrest-frame pivot-blocker lever 40 and causes the backrest-frame pivot-blocker lever 40 to contact the slip-blocker lever 42 thereby blocking the backrest frame 20 from pivoting about backrest-frame pivot axis 36 during a collision event, for example.

Illustratively, a tension spring 52 provides biasing means to normally bias the backrest-frame pivot-blocker lever 40 and the slip-blocker lever 42 to the locked configuration when the occupant support 10 is in the normal-seating configuration as shown in FIG. 5. Pivoting the seat back 14 relative to the seat bottom 12 past the forward-reclined position causes the backrest-frame brace unit 30 to change from the locked configuration to an unlocked configuration so that the backrest frame 20 is free to pivot about backrest-frame pivot axis 36 toward the seat bottom 12 in one, fluid motion.

The backrest-frame pivot-blocker lever 40 is moved by the slip-blocker lever 42 to pivot about pivot-blocker lever axis 44 between an engaged position and a freed position as the occupant support 10 pivots about recliner pivot axis 34 past the forward-reclined position as shown in FIGS. 5-12. In the engaged position, the backrest-frame pivot-blocker lever 40 blocks movement of the backrest frame 20 from the upright position to the folded-forward position. In the freed position, the backrest frame 20 is free to move from the upright position to the folded-forward position. In some embodiments, the backrest frame 20 may be biased toward the folded-forward position.

The slip-blocker lever 42 is moved after contacting a fixed stop 54 coupled to at least one of the seat-back recliner 28 and the seat bottom 12 as shown in FIGS. 5-12. The fixed stop 54 causes the slip-blocker lever 42 to pivot about the slip-blocker pivot axis 46 between a locked position and an unlocked position as the occupant support 10 pivots about recliner pivot axis 34 past the forward-reclined position. In the locked position, the slip-blocker lever 42 blocks the pivot-blocker lever 40 from pivoting about pivot-blocker lever axis 44. In the unlocked position, the pivot-blocker lever 40 is free to pivot about the pivot-blocker lever axis 44 to the freed position so that the backrest frame 20 can fold forward to the folded-forward position. It should be noted that in the engaged position and the locked position there may be a slight spacing between the components.

Figure 7:
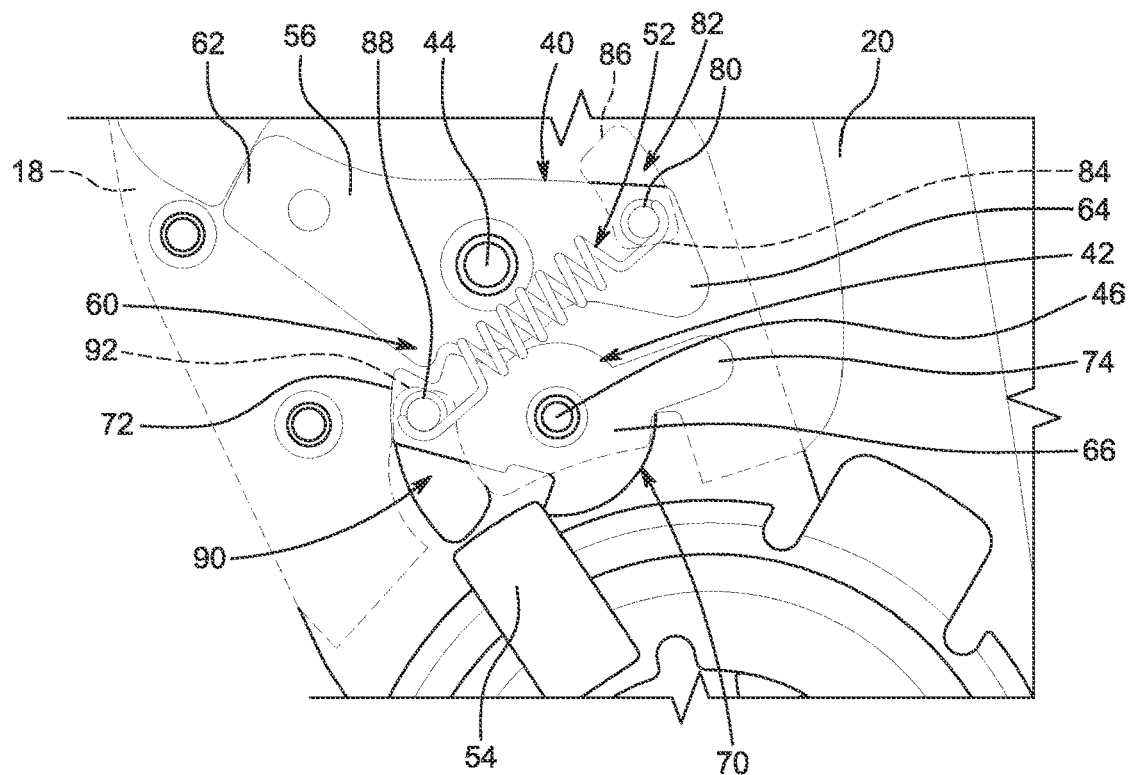
FIG. 7 is an enlarged view of a portion of FIG. 6 showing a portion of the seat-back brace unit engaged with a fixed stop coupled to the seat bottom.

The pivot-blocker lever 40 includes a lever body 56, a lever shaft 58 and a rotation-blocking stop 60 as shown in FIGS. 5 and 7. The lever body 56 includes a first end 62 that engages a portion of the backrest frame 20 in the normal-seating configuration to block rotation thereof and an opposite second end 64 that faces rearward away from the first end 62. The lever shaft 58 is positioned between the first end 62 and the second end 64 and provides the pivot-blocker lever axis 44. The rotation-blocking stop 60 is coupled to a bottom end of the lever body 56 between the first end 62 and the second end 64 and below the lever shaft 58. The rotation-blocking stop 60 engages a portion of the slip-blocker lever 42 to transfer forces (i.e. forward force 50) from the backrest frame 20 through the pivot-blocker lever 40 to the slip-blocker lever 42 to block rotation of the backrest frame 20 about backrest-frame pivot axis 36.

Figure 6:
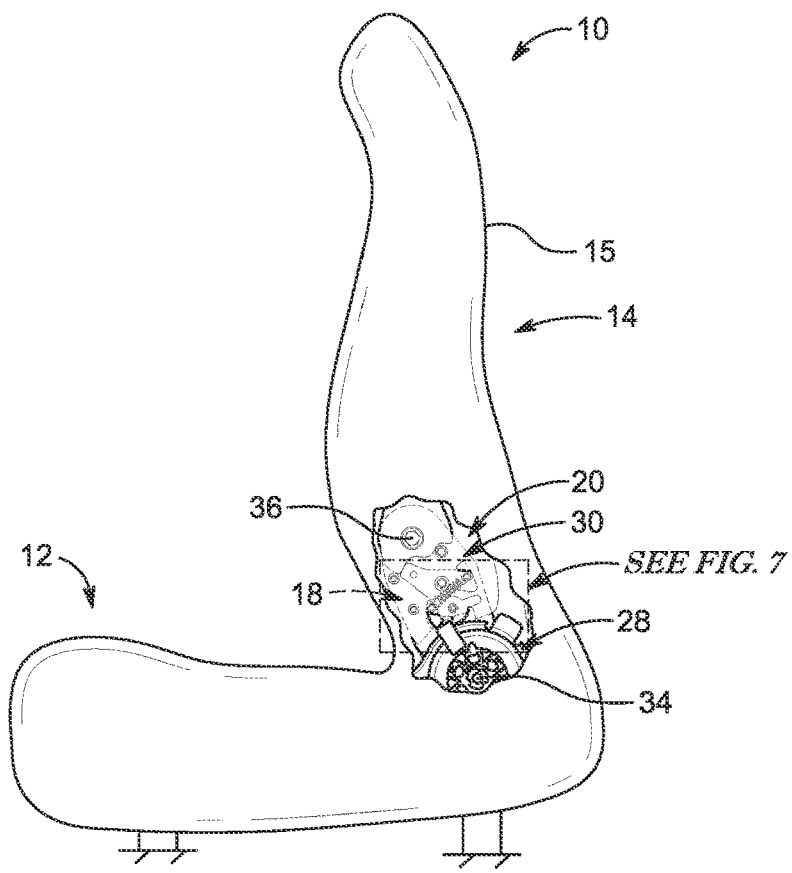
FIG. 6 is a side elevation view of the occupant support with portions cut away showing the seat back pivoted about a recliner pivot axis to a forward-reclined position.

The slip-blocker lever 42 includes a lever body 66 a lever shaft 68, and a catch 70 as shown in FIGS. 5 and 7. The lever body 66 includes a first end 72 having a blocking surface 73 that engages the rotation-blocking stop 60 in the normal-seating configuration and an opposite second end 74 that faces rearwardly away from the first end 72. The lever shaft 68 is positioned between the first end 72 and the second end 74 and provides the slip-blocker pivot axis 46. The slip-blocker pivot axis 46 is below the pivot-blocker lever axis 44. The catch 70 extends downwardly from the lever body 66 and engages the stop 54 coupled to the seat bottom 12 when the seat back 14 reaches the forward-reclined position as shown in FIGS. 6 and 7. The location of the fixed stop 54 relative to seat bottom 12 may be changed to increase or decrease the angle at which the seat back 14 reaches the forward-reclined position and begins changing from the normal-seating configuration to the console configuration.

The tension spring 52 extends between the second end 64 of the lever body 56 of pivot-blocker lever 40 and the first end 72 of the lever body 66 of slip-blocker lever 42 as shown in FIGS. 5-12. The tension spring 52 extends between pivot-blocker lever axis 44 and slip-blocker pivot axis 46 and applies a tensile force to cause the pivot-blocker lever 40 and the slip-blocker lever 42 to rotation in the same direction relative to one another. The first end 62 of the lever body 56 of pivot-blocker lever 40 is biased upwardly toward the backrest frame 20 to the engaged position with the backrest frame 20 when the occupant support 10 is in the normal-seating configuration. The first end 72 of the lever body 66 of the slip-blocker lever 42 is biased upwardly toward the pivot-blocker lever 40 to the locked position to engage with the rotation-blocking stop 60 of the pivot-blocker lever 40 when the occupant support 10 is in the normal-seating configuration.

Figure 8:
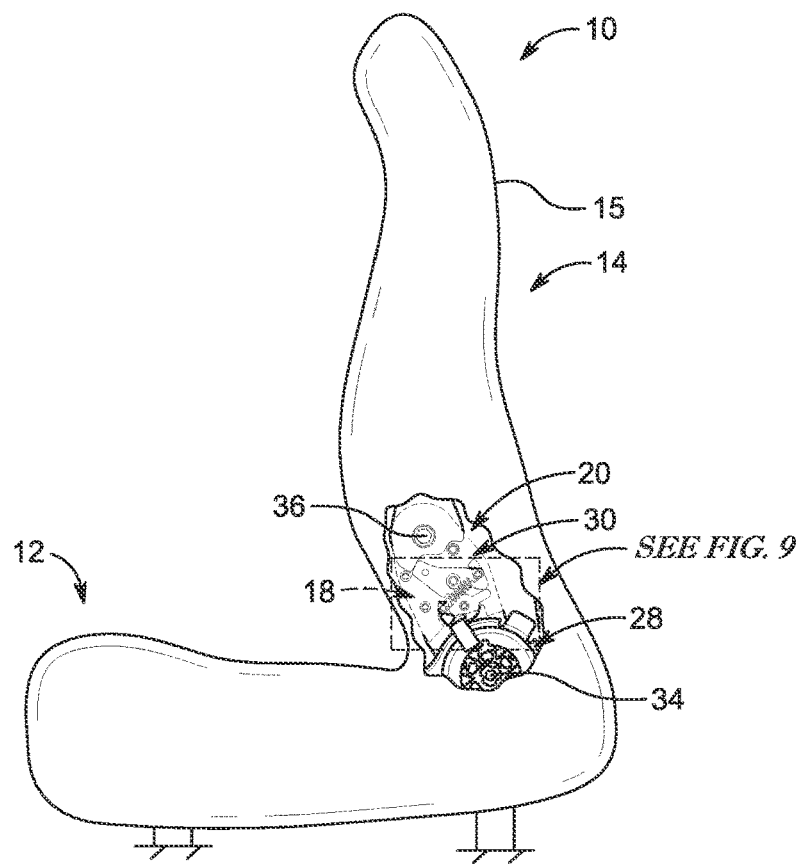
FIG. 8 is a side elevation view of the occupant support with portions cut away showing the seat back rotated about the recliner pivot axis to a position past the forward-reclined position.
Figure 9:
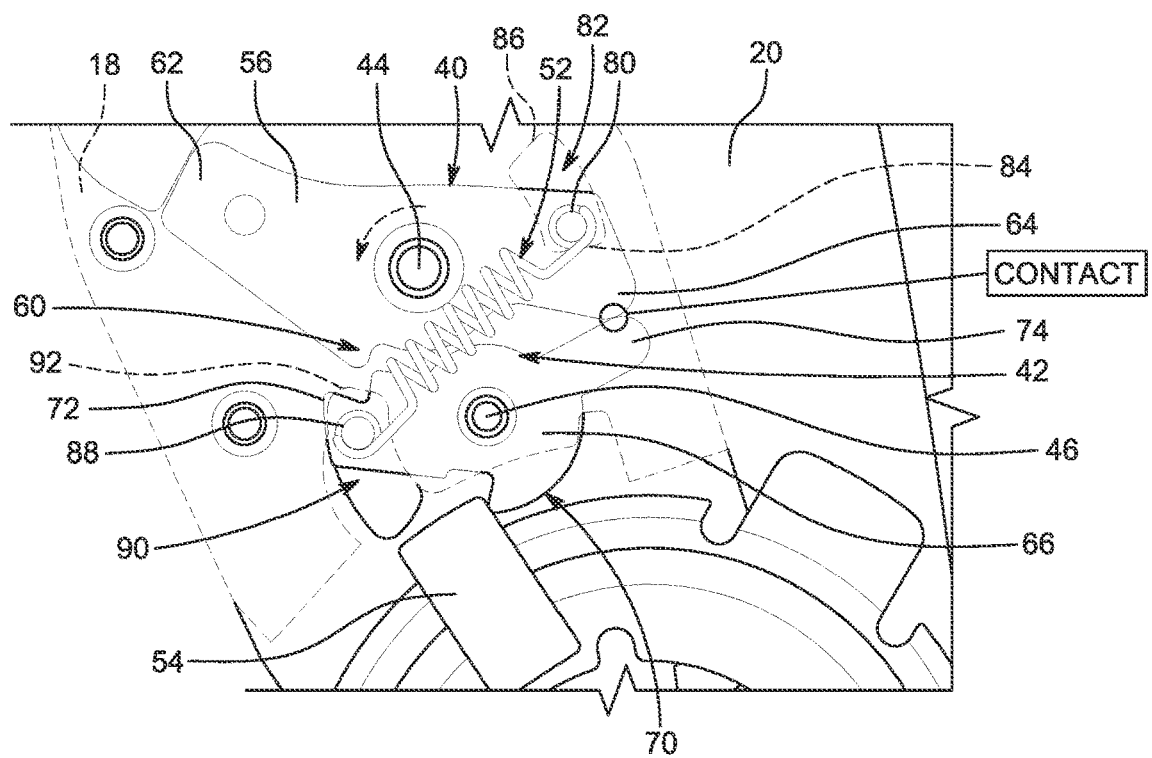
FIG. 9 is an enlarged view of a portion of FIG. 8 showing that the seat-back brace unit includes a pivot-blocker lever and a slip-blocker lever, and showing the slip-blocker lever engaging the fixed stop to cause the slip-blocker lever to pivot into contact with the pivot-blocker lever.

As the seat back 14 pivots forward about recliner pivot axis 34 past the forward-reclined position, the catch 70 engages stop 54 as shown in FIG. 7. The stop 54 causes the slip-blocker lever 42 to pivot about slip-blocker pivot axis 46 from the locked position to the unlocked position. While moving to the unlocked position, the first end 72 of the lever body 66 of slip-blocker lever 42 is pivoted downwardly away from the rotation-blocking stop 60 of the pivot-blocker lever 40 as shown in FIGS. 8 and 9. The second end 74 is pivoted upwardly toward the second end 64 of the lever body 56 of pivot-blocker lever 40. The second end 74 eventually contacts the second end 64 of the lever body 56 of pivot-blocker lever 40 as shown in FIG. 9.

The seat back 14 continues to pivot about recliner pivot axis 34 until a lower end 84 of the slip-blocker lever 42 contacts the stop 54 thereby stopping rotation of the backrest-frame support 18 about recliner pivot axis 34. The second end 74 of the lever body 66 of the slip-blocker lever 42 is configured to push the second end 64 of the lever body 56 of the pivot-blocker lever 40 upwardly such that the pivot-blocker lever 40 moves from the engaged position to the freed position as shown in FIG. 11. In the freed position, the first end 62 of the lever body 56 of the pivot-blocker lever 40 is moved downwardly away from the backrest frame 20 thereby freeing the backrest frame 20 to pivot about backrest-frame pivot axis 36 to the folded-forward position. A pin 102 fixed to the backrest-frame support 18 engages backrest frame 20 when the backrest frame reaches the console position to block further rotation of the backrest frame 20 relative to the backrest-frame support 18 about the backrest frame pivot axis 36.

The pivot-blocker lever 40 may further includes a first guide post 80 that travels through a first guide slot 82 formed in the backrest-frame support 18. The guide post 80 is coupled to the second end 64 of the lever body 56 and one end of the tension spring 52 is coupled to the guide post 80. The tension spring 52 biases the guide post 80 downward into engagement with a lower end 84 partially defining the first guide slot 82 to maintain the pivot-blocker lever 40 in the engaged position until pushed by the slip-blocker lever 42. The slip-blocker lever 42 pushes the pivot-blocker lever 40 upwardly until the guide post 80 contacts an upper end 86 partially defining guide slot 82 to the freed position of the pivot-blocker lever 40.

The slip-blocker lever 42 may further include a second guide post 88 that travels through a guide slot 90 formed in backrest-frame support 18. The guide post 88 is coupled to the first end 72 of the lever body 66. A second end of the tension spring 52 is coupled to the guide post 88. The tension spring 52 biases the guide post 88 upwardly into engagement with an upper end 92 partially defining the second guide slot 90 to maintain the slip-blocker lever 42 in the locked position until the catch 70 engages the stop 54 and the slip-blocker lever 42 is pivoted to the unlocked position.

The following numbered clauses include embodiments that are contemplated and non-limiting:

Clause 1. An occupant support includes a seat bottom.

Clause 2. The occupant support of clause 1, any other clause, or any suitable combination of clauses, further including a seat back including a backrest-frame support coupled to the seat bottom and arranged to extend upwardly away from the seat bottom in a normal-seating configuration, and a backrest frame coupled to the backrest-frame support and arranged to extend upward away from the backrest-frame support and the seat bottom in the normal-seating configuration.

Clause 3. The occupant support of clause 1, any other clause, or any suitable combination of clauses, further including a seat-back mode-changing unit including a seat back recliner coupled between the seat bottom and the backrest-frame support to provide a seat-back recliner pivot axis about which the seat back pivots relative to the seat bottom between a rearward-reclined position and a forward-reclined position when the seat back is in the normal-seating configuration, and a backrest frame brace unit coupled to the backrest-frame support and configured to block movement of the backrest frame relative to the backrest-frame support when the seat back is in the normal-seating configuration.

Clause 4. The occupant support of clause 1, any other clause, or any suitable combination of clauses, wherein the backrest frame is coupled to the backrest-frame support for pivotable movement relative to the backrest-frame support about a backrest-frame pivot axis that is spaced apart from the seat-back recliner pivot axis between an upright position when the backrest frame is in the normal-seating configuration and a folded-forward position in which the backrest frame folds forward toward the seat bottom relative to the backrest-frame support when the seat back is pivots forward past the forward-reclined position.

Clause 5. The occupant support of clause 4, any other clause, or any suitable combination of clauses, wherein the backrest-frame brace unit includes a backrest-frame pivot-blocker lever coupled to the backrest-frame support, a slip-blocker lever coupled to the backrest-frame support, and biasing means for biasing the backrest frame pivot-blocker lever and the slip-blocker lever normally to a locked position in which the backrest frame pivot-blocker lever and the slip-blocker lever cooperate to block movement of the backrest frame from the upright position to the folded-forward position while the seat back is in the normal-seating configuration.

Clause 6. The occupant support of clause 5, any other clause, or any suitable combination of clauses, wherein the biasing means includes a tension spring.

Clause 7. The occupant support of clause 5, any other clause, or any suitable combination of clauses, wherein the backrest frame pivot blocker lever is pivotable relative to the backrest frame and the backrest-frame support about a pivot-blocker lever axis between an engaged position in which the backrest frame pivot-blocker lever blocks movement of the backrest frame from the upright position to the folded-forward position, and a freed position, in which the backrest frame is free to move from the upright position to the folded-forward position.

Clause 8. The occupant support of clause 7, any other clause, or any suitable combination of clauses, wherein the slip-blocker lever is pivotable relative to the backrest frame and the backrest-frame support about a slip-blocker lever axis between a locked position, in which the slip-blocker lever blocks the pivot-blocker lever from moving to the freed position, and an unlocked position, in which the pivot-blocker lever moves to the freed position.

Clause 9. The occupant support of clause 8, any other clause, or any suitable combination of clauses, wherein the slip-blocker lever includes a lever body having a first end configured to engage the pivot-blocker lever to block the pivot-blocker lever from moving to the freed position and a second end that contacts the pivot-blocker lever to move the pivot-blocker lever to the freed position.

Clause 10. The occupant support of clause 4, any other clause, or any suitable combination of clauses, wherein the backrest-frame brace unit includes a backrest-frame pivot-blocker lever coupled to the backrest-frame support, a slip-blocker lever coupled to the backrest-frame support, and fixed stop coupled to at least one of the seat bottom and the seat-back recliner, and wherein the slip-blocker lever is configured to engage the fixed stop to change the pivot-blocker lever from an engaged position to a freed position in which the backrest frame is free to pivot about the backrest frame pivot axis.

Clause 11. The occupant support of clause 10, any other clause, or any suitable combination of clauses, wherein, after the pivot-blocker lever is moved to the freed position, the backrest frame pivots about the backrest-frame pivot axis independently of the seat back pivoting about the recliner pivot axis.

Clause 12. An occupant support includes: a seat bottom, a seat back including a backrest-frame support coupled to the seat bottom and arranged to extend upwardly away from the seat bottom in a normal-seating configuration, and a backrest frame coupled to the backrest-frame support and arranged to extend upward away from the backrest-frame support and the seat bottom in the normal-seating configuration, the seat back configured to pivot relative to the seat bottom about a seat-back recliner pivot axis between a rearward-reclined position and a forward-reclined position when the seat back is in the normal-seating configuration.

Clause 13. The occupant support of clause 12, any other clause, or any suitable combination of clauses, further including a backrest-frame brace unit coupled to the backrest-frame support and configured to block movement of the backrest frame relative to the backrest-frame support when the seat back is in the normal-seating configuration.

Clause 14. The occupant support of clause 13, any other clause, or any suitable combination of clauses, wherein the backrest frame is coupled to the backrest-frame support for pivotable movement relative to the backrest-frame support about a backrest frame pivot axis that is spaced apart from the seat-back recliner pivot axis between an upright position when the backrest frame is in the normal-seating configuration and a folded-forward position in which the backrest frame folds forward toward the seat bottom relative to the backrest-frame support when the seat back is pivots forward past the forward-reclined position.

Clause 15. The occupant support of clause 14, any other clause, or any suitable combination of clauses, wherein the backrest-frame brace unit includes a backrest-frame pivot-blocker lever coupled to the backrest-frame support, a slip-blocker lever coupled to the backrest-frame support, and biasing means for biasing the backrest frame pivot-blocker lever and the slip-blocker lever normally to a locked position in which the backrest frame pivot-blocker lever and the slip-blocker lever cooperate to block movement of the backrest frame from the upright position to the folded-forward position while the seat back is in the normal-seating configuration.

Clause 16. The occupant support of clause 15, any other clause, or any suitable combination of clauses, wherein the biasing means includes a tension spring.

Clause 17. The occupant support of clause 16, any other clause, or any suitable combination of clauses, wherein the tension spring extends between a rearward end of the pivot-blocker lever and a forward end of the slip-blocker lever and provides a tensile force to bias the pivot-blocker lever and the slip-blocker lever in the same direction.

Clause 18. The occupant support of clause 15, any other clause, or any suitable combination of clauses, wherein the backrest frame pivot blocker lever is pivotable relative to the backrest frame and the backrest-frame support about a pivot-blocker lever axis between an engaged position in which the backrest frame pivot-blocker lever blocks movement of the backrest frame from the upright position to the folded-forward position, and a freed position, in which the backrest frame is free to move from the upright position to the folded-forward position.

Clause 19. The occupant support of clause 18, any other clause, or any suitable combination of clauses, wherein the slip-blocker lever is pivotable relative to the backrest frame and the backrest-frame support about a slip-blocker lever axis between a locked position, in which the slip-blocker lever blocks the pivot-blocker lever from moving to the freed position, and an unlocked position, in which the pivot-blocker lever moves to the freed position.

Clause 20. The occupant support of clause 19, any other clause, or any suitable combination of clauses, wherein the slip-blocker lever includes a lever body having a first end configured to engage the pivot-blocker lever to block the pivot-blocker lever from moving to the freed position and a second end that contacts the pivot-blocker lever to move the pivot-blocker lever to the freed position.

Clause 21. The occupant support of clause 12, any other clause, or any suitable combination of clauses, wherein the backrest-frame brace unit includes a backrest-frame pivot-blocker lever coupled to the backrest-frame support, a slip-blocker lever coupled to the backrest-frame support, and fixed stop coupled to the seat bottom, and wherein the slip-blocker lever is configured to engage the fixed stop to change the pivot-blocker lever from an engaged position to a freed position in which the backrest frame is free to pivot about the backrest frame pivot axis.

Clause 22. The occupant support of clause 21, any other clause, or any suitable combination of clauses, wherein, after the pivot-blocker lever is moved to the freed position, the backrest frame pivots about the backrest-frame pivot axis independently of the seat back pivoting about the recliner pivot axis.

Clause 23. The occupant support of clause 2, any other clause, or any suitable combination of clauses, further including seat-back mode changer means for reclining the seat back relative to the seat bottom about a seat-back recline axis between a rearward-reclined position and a forward-reclined position and pivoting a portion of the seat back forward toward the seat bottom about an upper pivot axis as the seat back pivots forward past the forward-reclined position to change the seat back from the normal-seating configuration to a folded-forward configuration in which the portion of the seat back extends generally horizontally relative to the seat bottom so that the seat back provides a console for an occupant seated next to the occupant support.

Clause 24. The occupant support of clause 23, any other clause, or any suitable combination of clauses, wherein the seat-back mode changer means includes a seat back recliner coupled between the seat bottom and the seat back to provide the seat-back recliner pivot axis about which the seat back pivots relative to the seat bottom between a rearward-reclined position and a forward-reclined position when the seat back is in the normal-seating configuration and a backrest-frame brace unit coupled to the backrest-frame support and configured to block movement the portion of the seat back about the upper pivot axis when the seat back is in the normal-seating configuration.

The invention claimed is:

1. An occupant support comprising
a seat bottom,
a seat back including a backrest-frame support coupled to the seat bottom and arranged to extend upwardly away from the seat bottom in a normal-seating configuration, and a backrest frame coupled to the backrest-frame support and arranged to extend upward away from the backrest-frame support and the seat bottom in the normal-seating configuration, and
a seat-back mode-changing unit including a seat back recliner arranged between the seat bottom and the backrest-frame support to provide a seat-back recliner pivot axis about which the seat back pivots relative to the seat bottom between a rearward-reclined position and a forward-reclined position when the seat back is in the normal-seating configuration, and a backrest-frame brace unit coupled to the backrest-frame support and configured to block movement of the backrest frame relative to the backrest-frame support when the seat back is in the normal-seating configuration,
wherein the backrest frame is coupled to the backrest-frame support for pivotable movement relative to the backrest-frame support about a backrest-frame pivot axis that is spaced apart from the seat-back recliner pivot axis between an upright position when the backrest frame is in the normal-seating configuration and a folded-forward position in which the backrest frame folds forward toward the seat bottom relative to the backrest-frame support when the seat back pivots forward past the forward-reclined position,
wherein the backrest-frame brace unit includes a backrest-frame pivot-blocker lever coupled to the backrest-frame support, a slip-blocker lever coupled to the backrest-frame support, and a fixed stop coupled to at least one of the seat bottom and the seat-back recliner, and wherein the slip-blocker lever is configured to engage the fixed stop to change the backrest-frame pivot-blocker lever from an engaged position to a freed position in which the backrest frame is free to pivot about the backrest-frame pivot axis,
wherein the fixed stop is stationary and remains fixed relative to the slip-blocker lever in response to the seat back pivoting between the forward-reclined position.

2. The occupant support of claim 1, wherein the backrest-frame brace unit includes biasing means for biasing the backrest-frame pivot-blocker lever and the slip-blocker lever normally to a locked position in which the backrest-frame pivot-blocker lever and the slip-blocker lever cooperate to block movement of the backrest frame from the upright position to the folded-forward position while the seat back is in the normal-seating configuration.

3. The occupant support of claim 2, wherein the biasing means includes a tension spring.

4. The occupant support of claim 2, wherein the backrest-frame pivot-blocker lever is pivotable relative to the backrest frame and the backrest-frame support about a pivot-blocker lever axis between the engaged position in which the backrest-frame pivot-blocker lever blocks movement of the backrest frame from the upright position to the folded-forward position, and the freed position, in which the backrest frame is free to move from the upright position to the folded-forward position.

5. The occupant support of claim 4, wherein the slip-blocker lever is pivotable relative to the backrest frame and the backrest-frame support about a slip-blocker lever axis between a locked position, in which the slip-blocker lever blocks the backrest-frame pivot-blocker lever from moving to the freed position, and an unlocked position, in which the backrest-frame pivot-blocker lever moves to the freed position.

6. The occupant support of claim 1, wherein, after the backrest-frame pivot-blocker lever is moved to the freed position, the backrest frame pivots about the backrest-frame pivot axis independently of the seat back pivoting about the recliner pivot axis.

7. An occupant support comprising
a seat bottom,
a seat back including a backrest-frame support coupled to the seat bottom and arranged to extend upwardly away from the seat bottom in a normal-seating configuration, and a backrest frame coupled to the backrest-frame support and arranged to extend upward away from the backrest-frame support and the seat bottom in the normal-seating configuration, and
a seat-back mode-changing unit including a seat back recliner arranged between the seat bottom and the backrest-frame support to provide a seat-back recliner pivot axis about which the seat back pivots relative to the seat bottom between a rearward-reclined position and a forward-reclined position when the seat back is in the normal-seating configuration, and a backrest-frame brace unit coupled to the backrest-frame support and configured to block movement of the backrest frame relative to the backrest-frame support when the seat back is in the normal-seating configuration,
wherein the backrest frame is coupled to the backrest-frame support for pivotable movement relative to the backrest-frame support about a backrest-frame pivot axis that is spaced apart from the seat-back recliner pivot axis between an upright position when the backrest frame is in the normal-seating configuration and a folded-forward position in which the backrest frame folds forward toward the seat bottom relative to the backrest-frame support when the seat back pivots forward past the forward-reclined position,
wherein the backrest-frame brace unit includes a backrest-frame pivot-blocker lever coupled to the backrest-frame support, a slip-blocker lever coupled to the backrest-frame support, and biasing means for biasing the backrest-frame pivot-blocker lever and the slip-blocker lever normally to a locked position in which the backrest-frame pivot-blocker lever and the slip-blocker lever cooperate to block movement of the backrest frame from the upright position to the folded-forward position while the seat back is in the normal-seating configuration,
wherein the backrest-frame pivot-blocker lever is pivotable relative to the backrest frame and the backrest-frame support about a pivot-blocker lever axis between the engaged position in which the backrest-frame pivot-blocker lever blocks movement of the backrest frame from the upright position to the folded-forward position, and the freed position, in which the backrest frame is free to move from the upright position to the folded-forward position,
wherein the slip-blocker lever is pivotable relative to the backrest frame and the backrest-frame support about a slip-blocker lever axis between a locked position, in which the slip-blocker lever blocks the backrest-frame pivot-blocker lever from moving to the freed position, and an unlocked position, in which the backrest-frame pivot-blocker lever moves to the freed position,
wherein the slip-blocker lever includes a lever body having a first end configured to engage the backrest-frame pivot-blocker lever to block the backrest-frame pivot-blocker lever from moving to the freed position and a second end that contacts the backrest-frame pivot-blocker lever to move the backrest-frame pivot-blocker lever to the freed position.

8. An occupant support comprising
a seat bottom,
a seat back including a backrest-frame support coupled to the seat bottom and arranged to extend upwardly away from the seat bottom in a normal-seating configuration, and a backrest frame coupled to the backrest-frame support and arranged to extend upward away from the backrest-frame support and the seat bottom in the normal-seating configuration, the seat back configured to pivot relative to the seat bottom about a seat-back recliner pivot axis between a rearward-reclined position and a forward-reclined position when the seat back is in the normal-seating configuration, and
a backrest-frame brace unit coupled to the backrest-frame support and configured to block movement of the backrest frame relative to the backrest-frame support when the seat back is in the normal-seating configuration,
wherein the backrest frame is coupled to the backrest-frame support for pivotable movement relative to the backrest-frame support about a backrest-frame pivot axis that is spaced apart from the seat-back recliner pivot axis between an upright position when the backrest frame is in the normal-seating configuration and a folded-forward position in which the backrest frame folds forward toward the seat bottom relative to the backrest-frame support when the seat back pivots forward past the forward-reclined position,
wherein the backrest-frame brace unit includes a backrest-frame pivot-blocker lever coupled to the backrest-frame support, a slip-blocker lever coupled to the backrest-frame support, and a tension spring extending between and interconnecting a rearward end of the backrest-frame pivot-blocker lever and a forward end of the slip-blocker lever.

9. The occupant support of claim 8, wherein the tension spring biases the backrest-frame pivot-blocker lever and the slip-blocker lever normally to a locked position in which the backrest-frame pivot-blocker lever and the slip-blocker lever cooperate to block movement of the backrest frame from the upright position to the folded-forward position while the seat back is in the normal-seating configuration.

10. The occupant support of claim 9, wherein the backrest-frame pivot blocker lever is pivotable relative to the backrest frame and the backrest-frame support about a pivot-blocker lever axis between an engaged position in which the backrest-frame pivot-blocker lever blocks movement of the backrest frame from the upright position to the folded-forward position, and a freed position, in which the backrest frame is free to move from the upright position to the folded-forward position.

11. The occupant support of claim 10, wherein the slip-blocker lever is pivotable relative to the backrest frame and the backrest-frame support about a slip-blocker lever axis between a locked position, in which the slip-blocker lever blocks the backrest-frame pivot-blocker lever from moving to the freed position, and an unlocked position, in which the backrest-frame pivot-blocker lever moves to the freed position.

12. The occupant support of claim 8, wherein the tension spring provides a tensile force to bias the backrest-frame pivot-blocker lever and the slip-blocker lever towards each other.

13. The occupant support of claim 8, wherein the backrest-frame brace unit includes a fixed stop coupled to the seat bottom, and wherein the slip-blocker lever is configured to engage the fixed stop to change the backrest-frame pivot-blocker lever from an engaged position to a freed position in which the backrest frame is free to pivot about the backrest-frame pivot axis.

14. The occupant support of claim 13, wherein, after the backrest-frame pivot-blocker lever is moved to the freed position, the backrest frame pivots about the backrest-frame pivot axis independently of the seat back pivoting about the recliner pivot axis.

15. An occupant support comprising
a seat bottom,
a seat back including a backrest-frame support coupled to the seat bottom and arranged to extend upwardly away from the seat bottom in a normal-seating configuration, and a backrest frame coupled to the backrest-frame support and arranged to extend upward away from the backrest-frame support and the seat bottom in the normal-seating configuration, the seat back configured to pivot relative to the seat bottom about a seat-back recliner pivot axis between a rearward-reclined position and a forward-reclined position when the seat back is in the normal-seating configuration, and
a backrest-frame brace unit coupled to the backrest-frame support and configured to block movement of the backrest frame relative to the backrest-frame support when the seat back is in the normal-seating configuration,
wherein the backrest frame is coupled to the backrest-frame support for pivotable movement relative to the backrest-frame support about a backrest-frame pivot axis that is spaced apart from the seat-back recliner pivot axis between an upright position when the backrest frame is in the normal-seating configuration and a folded-forward position in which the backrest frame folds forward toward the seat bottom relative to the backrest-frame support when the seat back pivots forward past the forward-reclined position,
wherein the backrest-frame brace unit includes a backrest-frame pivot-blocker lever coupled to the backrest-frame support, a slip-blocker lever coupled to the backrest-frame support, and biasing means for biasing the backrest-frame pivot-blocker lever and the slip-blocker lever normally to a locked position in which the backrest-frame pivot-blocker lever and the slip-blocker lever cooperate to block movement of the backrest frame from the upright position to the folded-forward position while the seat back is in the normal-seating configuration,
wherein the backrest-frame pivot blocker lever is pivotable relative to the backrest frame and the backrest-frame support about a pivot-blocker lever axis between an engaged position in which the backrest-frame pivot-blocker lever blocks movement of the backrest frame from the upright position to the folded-forward position, and a freed position, in which the backrest frame is free to move from the upright position to the folded-forward position,
wherein the slip-blocker lever is pivotable relative to the backrest frame and the backrest-frame support about a slip-blocker lever axis between a locked position, in which the slip-blocker lever blocks the backrest-frame pivot-blocker lever from moving to the freed position, and an unlocked position, in which the backrest-frame pivot-blocker lever moves to the freed position,
wherein the slip-blocker lever includes a lever body having a first end configured to engage the backrest-frame pivot-blocker lever to block the backrest-frame pivot-blocker lever from moving to the freed position and a second end that contacts the backrest-frame pivot-blocker lever to move the backrest-frame pivot-blocker lever to the freed position.

16. An occupant support comprising
a seat bottom,
a seat back arranged to extend upwardly away from the seat bottom in a normal-seating configuration, and
seat-back mode changer means for reclining the seat back relative to the seat bottom about a seat-back recliner pivot axis between a rearward-reclined position and a forward-reclined position and pivoting a portion of the seat back forward toward the seat bottom about an upper pivot axis as the seat back pivots forward past the forward-reclined position to change the seat back from the normal-seating configuration to a folded-forward position in which the portion of the seat back extends generally horizontally relative to the seat bottom so that the seat back provides a console for an occupant seated next to the occupant support.

17. The occupant support of claim 16, wherein the seat-back mode changer means includes a seat back recliner arranged between the seat bottom and the seat back to provide the seat-back recliner pivot axis about which the seat back pivots relative to the seat bottom between the rearward-reclined position and the forward-reclined position when the seat back is in the normal-seating configuration and a backrest-frame brace unit coupled to a backrest-frame support included in the seat back and configured to block movement of the portion of the seat back about the upper pivot axis when the seat back is in the normal-seating configuration.

18. The occupant support of claim 17, wherein the backrest-frame brace unit includes a backrest-frame pivot-blocker lever coupled to the backrest-frame support, a slip-blocker lever coupled to the backrest-frame support, and biasing means for biasing the backrest-frame pivot-blocker lever and the slip-blocker lever normally to a locked position in which the backrest-frame pivot-blocker lever and the slip-blocker lever cooperate to block movement of the backrest frame from an upright position to the folded-forward position while the seat back is in the normal-seating configuration.

* * * * *